United States Patent [19]
Ruckel

[11] 3,944,624
[45] Mar. 16, 1976

[54] POLYMERIC PINENE EPOXIDES AND PROCESS FOR PREPARING THE SAME

[75] Inventor: Erwin Richard Ruckel, Darien, Conn.

[73] Assignee: American Cyanamid Company, Stamford, Conn.

[22] Filed: Jan. 24, 1975

[21] Appl. No.: 543,762

[52] U.S. Cl. ....... 260/611 B; 260/29.8; 260/28.5 B; 260/33.2 EP
[51] Int. Cl.² .......................................... C07C 43/18
[58] Field of Search ................................ 260/611 B

[56] References Cited
UNITED STATES PATENTS
3,230,202    1/1966    Tinsley et al. .............. 260/611 B X OTHER PUBLICATIONS
Wittbecker et al., JACS, Vol. 82, (1960), pp. 1218–1222.
Hartshorn, Jour. Chem. Soc., (1964), pp. 5494–5496.

*Primary Examiner*—Bernard Helfin
*Attorney, Agent, or Firm*—Harry H. Kline

[57] ABSTRACT

There are provided α-pinene epoxide polymers and β-pinene epoxide polymers prepared by polymerizing monomeric α-pinene epoxide or β-pinene epoxide dissolved in a non-polar solvent at a temperature ranging from between about −20°C. and about −150°C. in the presence of an inorganic, nonmetallic, fluoride catalyst, such as boron trifluoride and phosphorous pentafluoride, to obtain an optically active polymer useful as a tackifier in an adhesive composition.

10 Claims, No Drawings

POLYMERIC PINENE EPOXIDES AND PROCESS FOR PREPARING THE SAME

The present invention relates to a process for preparing polymeric terpene epoxides and to novel polymers so prepared. More particularly, it relates to pinene epoxide polymers and to the low temperature polymerization of either $\alpha$-pinene epoxide or $\beta$-pinene epoxide in the presence of an inorganic, non-metallic, Lewis acid, fluoride catalyst. Still more particularly, it relates to the polymerization of either $\alpha$- or $\beta$-pinene epoxide utilizing low temperature, Lewis acid catalytic techniques to obtain the corresponding polymer useful as a tackifier for rubbers or elastomers when blended therewith.

In the past, attempts have been made to polymerize terpene epoxides. Unfortunately, none of the processes used to affect polymerizable monomers can be satisfactorily applied to terpene epoxides. Thus, for instance, in contacting $\alpha$-pinene epoxide with a Lewis acid, rearranged monomers, rather than polymers, result. Consequently, terpene polymers having polarity that are compatible with rubbers or elastomers cannot be readily formed. If a terpene epoxide polymer could be formed, both such polymeric materials as well as the method for preparing the same, would fulfill a need long recognized in the art.

It is, therefore, a principal object of the invention to prepare a polar terpene resin or polymer in which the terpene mers thereof are interconnected with an oxygen atom. It is a further object of the invention to provide a process for polymerizing a terpene epoxide with Lewis acid catalyst to obtain a polar polymer useful as a tackifier for rubbers and elastomers. Other objects and advantages will become apparent from a reading of the ensuing description.

To these ends, it has been found that pinene epoxide can be readily polymerized in good yield in a straightforward manner. Pinene epoxide, admixed with a non-polar solvent, is subjected to the action of an inorganic, non-metallic, fluoride catalyst at temperature ranging below about $-20°C$., whereby there is obtained a polymer in good yield and purity.

According to the invention, there is provided a process for polymerizing either $\alpha$-pinene epoxide or $\beta$-pinene epoxide in the presence of an inert, non-polar solvent therefor. The overall process involves the utilization of an inorganic, non-metallic, fluoride catalyst at a temperature ranging from about $-20°C$. to about $-150°C$., and preferably between about $-75°C$. and about $-100°C$., so as to obtain a polymer having a molecular weight ranging from about 780 to about 1420.

In general, any inorganic, non-metallic fluoride catalyst can be employed. Exemplary of the latter are boron trifluoride and phosphorous pentafluoride.

It is a good practice to utilize an inert non-polar solvent either the $\alpha$-pinene - or $\beta$-pinene epoxide to be polymerized. Illustrative solvents include pentane, hexane, benzene, toluene, xylene and equivalents thereof. The use of inert non-polar solvents has been found to be critical. Polar solvents, it has been found, radically reduce the overall yield of resultant polymer.

For a fuller understanding of the invention, the following examples are presented which are to be taken merely as illustrative and are not to be deemed as being limitative thereof. The parts are by weight unless otherwise stated.

EXAMPLE 1

Preparation of Poly-$\alpha$-Pinene Epoxide

To a suitable three neck, round bottom flask equipped with stirrer, thermometer and gas inlet are added 40 parts of hexane, 15 parts of $\alpha$-pinene epoxide monomer and 0.55 parts of ter-butyl chloride. The monomer and catalyst mixture is cooled to $-78°C$. under a stream of dry nitrogen while introducing boron trifluoride gas beneath the liquid surface through the gas inlet. Polymerization commences with an abrupt temperature rise of $10°$ centigrade to $-68°C$. and the simultaneous appearance of a pale yellow color. At this stage, boron trifluoride introduction is stopped and the polymerization mixture is stirred for two minutes at which time 10 parts (by volume) of methanol are added to deactivate the catalyst. The temperature is allowed to rise to $0°C$., whereupon 50 parts (by volume) of 5% aqueous sodium bicarbonate are added. The aqueous phase is next separated and the organic phase is again washed with additional sodium bicarbonate solution, followed by washings with water until the aqueous washings are found to be neutral.

The major portion of solvent is then distilled from the polymer solution and the viscous oil residue dissolved in 10 parts (by volume) of toluene. The polymer solution is next added dropwise to 250 parts (by volume) of methanol to effect precipitation of the $\alpha$-pinene epoxide polymer. The polymer, present as a slurry of white powder, is collected by filtration and dried in vacuo to a weight of 3.0 parts, corresponding to a 20% yield.

The molecular weight of resultant polymer is 1025, indicating the average polymer chain to be composed of 6.7 monomer units. The melting point range of the same polymer is between about $67°C$. and $80°C$. The polymer is optically active having an $[\alpha]_D^{25} = +18.8°$ (CHCl C=1.07); $\alpha$-pinene epoxide monomer has a $[\alpha]_D^{25} = +48.0°$ (CHCl C=1.76).

EXAMPLE 2

Preparation of Poly-$\beta$-Pinene Epoxide

To a suitable three neck, round bottom flask fitted with stirrer, thermometer and gas inlet are charged 40 parts of pentane and 10 parts of $\beta$-pinene epoxide monomer. The monomer catalyst solution is cooled to $-125°C$. and phosphorus pentafluoride is introduced through the gas inlet beneath the liquid surface. The rate of phosphorus pentafluoride addition is adjusted to maintain the temperature of the polymerizing mixture between about $-125°C$. and $-130°C$.

The polymerization mixture is stirred for an additional 5 minutes after which time 10 parts (by volume) of methanol are added to deactivate the catalyst. The temperature is allowed to rise to $0°C$., whereupon 50 parts (by volume) of 5% aqueous sodium bicarbonate are added. The aqueous phase is separated and the organic phase again washed with bicarbonate solution, followed by washings until the aqueous washings are neutral.

The major portion of solvent is next distilled from the polymer solution and the mobile oily residue is dissolved in 10 parts by volume of benzene. This polymer solution is then added dropwise to 200 parts (by volume) of methanol to effect precipitation of the $\beta$-pinene epoxide polymer. The polymer, present as a white powder, is collected by filtration and dried in vacuo to a weight of 0.85 part, corresponding to a 8.5% yield.

The molecular weight of resultant polymer is found to be 780, indicating the average chain to be formed from 5.1 monomer units. The melting point range of the polymer is between 78°C. and 90°C. with an initial, softening point beginning at 68°C. The polymer is optically active having an optical rotation of $[\alpha]_D^{25} = -31°$ (CHCl C=1.0); β-pinene epoxide monomer having an optical rotation, $[\alpha]_D^{25}$, equal to +13° (CHCl C=1.84)

EXAMPLE 3

This example illustrates the use of poly-α-pinene epoxide as a tackifier for rubber.

The polymers of Examples 1 and 2 are evaluated as pressure-sensitive adhesives containing the following composition:

100 parts of a commercially obtained polyisoprene previously milled to a Mooney viscosity of 50. 75 parts of the polymer 1 part of antioxidant The formulations are utilized to prepare pressure-sensitive tapes according to conventional procedures. The tapes are then evaluated according to standard test procedures of the Pressure-Sensitive Tape Council (PSTC).

For comparison purposes, similar formulations are prepared of the homopolymer of α-pinene.

Results of the test evaluations are presented in Table I, below.

I claim:

1. A homopolymer having a molecular weight ranging between about 780 and 1420 and being selected from the group consisting of poly-α-pinene epoxide and poly-β-pinene epoxide.
2. The homo polymer of claim 1: poly-α-pinene epoxide.
3. The homo polymer of claim 1: poly-β-pinene epoxide.
4. A process for the preparation of a homo polymer according to claim 1 which comprises the steps of: contacting monomeric α-pinene epoxide or monomeric β-pinene epoxide, dissolved in an inert, non-polar solvent, at a temperature ranging between −20°C. and −150°C. in the presence of an inorganic, non-metallic, fluoride catalyst, and thereafter recovering resultant polymer.
5. The process according to claim 4 wherein the inert solvent is pentane.
6. The process according to claim 4 wherein the inert solvent is toluene.
7. The process according to claim 4 wherein the inorganic fluoride catalyst is boron trifluoride.
8. The process according to claim 4 wherein the inorganic fluoride catalyst is phosphorus pentafluoride.
9. The process according to claim 4 wherein the monomer contacted is α-pinene epoxide.
10. The process according to claim 4 wherein the monomer contacted is β-pinene epoxide.

* * * * *

TABLE I

| Polyterpene of: | 180° Shear Adhesion [1] (Min) | Tack [2] | | | 180° Peel Adhesion [3] (oz/in) | |
|---|---|---|---|---|---|---|
| | | initial | 1 wk. | 2 wks. | initial | 2 wks. |
| Ex. 1 | 650 | 11+ | 4.3 | 4.8 | 14.0 | 18.7 |
| Ex. 2 | 1124 | 11+ | 8.0 | 7.2 | 14.3 | 19.1 |
| Homopolymer of: α-pinene | 203 | 0.2 | 0.2 | 0.3 | 28 | 30 |
| Homopolymer of: β-pinene | 720 | 2.6 | 1.8 | 3.0 | 28 | 29 |

[1] Test method PSTC-2 modified so adhesive-metal contact angle is 20°.
[2] Test method PSTC-18
[3] Test method PSTC-1